United States Patent [19]

Tobey

[11] 4,441,376

[45] Apr. 10, 1984

[54] MOTOR DRIVEN HINGE ASSEMBLY

[75] Inventor: William H. Tobey, Littleton, Colo.

[73] Assignee: Martin Marietta Corporation, Bethesda, Md.

[21] Appl. No.: 373,575

[22] Filed: Apr. 30, 1982

[51] Int. Cl.³ ............... F16H 29/20; F16H 21/44; E05D 7/04; E05D 7/06

[52] U.S. Cl. ............... 74/89.15; 16/223; 16/241; 16/245; 49/340; 74/105

[58] Field of Search ............ 16/221, 223, 238, 241, 16/245, 246, 354, DIG. 29; 49/340, 341, 344, 349, 351, 362; 74/89.15, 105

[56] References Cited

U.S. PATENT DOCUMENTS

| | | | |
|---|---|---|---|
| 1,590,570 | 6/1926 | Flack et al. | 74/89.15 |
| 2,011,057 | 8/1935 | Kraft | 49/340 X |
| 2,306,723 | 12/1942 | Floraday | 268/124 |
| 3,081,994 | 3/1963 | Martens | 268/108 |
| 3,129,715 | 4/1964 | Militano et al. | 135/20 |
| 3,295,699 | 1/1967 | Bauernschub, Jr. | 214/1 |
| 3,320,698 | 5/1967 | Hummel | 49/340 |
| 3,760,456 | 9/1973 | Mark | 16/223 |
| 4,074,682 | 2/1978 | Yoon | 135/4 |
| 4,243,105 | 1/1981 | Vogel et al. | 16/223 X |

Primary Examiner—Fred Silverberg
Attorney, Agent, or Firm—Patrick M. Hogan; Philip L. DeArment; Gay Chin

[57] ABSTRACT

A motor driven hinge assembly for effecting relative pivotal motion between hinged members. The assembly includes first and second members hinged together, drive links slidingly connected to the first member and pivotally connected to the second member, a motor disposed within the first member and a gear train and lead screw connecting the motor with the drive links. Actuation of the motor effects pivotal motion of the second member relative to the first member between folded and unfolded positions.

6 Claims, 7 Drawing Figures

MOTOR DRIVEN HINGE ASSEMBLY

BACKGROUND OF THE INVENTION

1. Field of the Invention

This invention relates to hinge mechanisms and particularly to a new and improved motor driven hinge assembly which provides reversible hinge motion with high mechanical advantage.

2. Description of the Prior Art

In certain situations, it is desirable to have self-powered hinge mechanisms to fold or unfold hinged members. For example, large space structures comprising multitubular frames are folded prior to their launch into space in order to fit in the launch vehicle and then are unfolded during their deployment in space. The hinged tubular members comprising the frames must have the capability of unfolding upon remote command in such a space environment. Furthermore, the self-powered hinge mechanisms which unfold the frames must be compact so as to not use up scarce room in the launch vehicle yet the mechanisms must exert sufficient force and have enough mechanical advantage to unfold the hinged members of the frame.

One suitable mechanism to provide self-powered unfolding of the tubular members is a spring powered hinge. Spring powered hinges, however, operate in only one direction and are therefore not capable of folding the members, should that become necessary. It may be desirable, for example, to retrieve a large space structure from space. To do so would require folding the frames of the structure in order to fit the structure into the retrieving vehicle. A separate drive mechanism would be required to overcome the force of the spring powered hinges in order to fold the frames, thus increasing weight, complexity and cost.

Another shortcoming of spring powered hinges is that only two pivotal positions of the hinged members are available, folded and unfolded. The spring mechanism does not provide selectable intermediate pivotal positions between the folded and unfolded positions.

In view of the above mentioned problems, it is therefore an object of the present invention to provide a motor driven hinge assembly which not only can unfold but which can also fold hinged members as desired.

Another object of the present invention is to provide a motor driven hinge assembly which permits hinged members to be pivotally positioned at numerous positions intermediate the folded and unfolded positions.

Yet another object of the present invention is to provide a motor driven hinge assembly which is compact yet which has a high mechanical advantage.

SUMMARY OF THE INVENTION

The present invention, in accordance with one embodiment thereof, comprises a motor driven hinge assembly for effecting relative pivotal motion of a second member relative to a first member. The assembly comprises first and second members hingedly connected, linking means slidingly connected with the first member and pivotally connected with the second member, a motor disposed within the first member, and coupling means between the motor and the linking means for effecting motion of the linking means and thereby effecting pivotal motion of the second member relative to the first member.

In a particular embodiment of the invention, the linking means comprises a pair of drive links including a rod with a threaded opening therein extending between the drive links. The coupling means includes a threaded lead screw sized for being received by the threaded opening. The lead screw is rotated by the motor through a gear train and the rotation effects motion of the drive links along the lead screw, thereby effecting pivotal motion of the second member relative to the first.

BRIEF DESCRIPTION OF THE DRAWING

This invention will be better understood from the following description taken in conjunction with the accompanying drawing wherein.

DESCRIPTION OF THE PREFERRED EMBODIMENT

Figure 1:
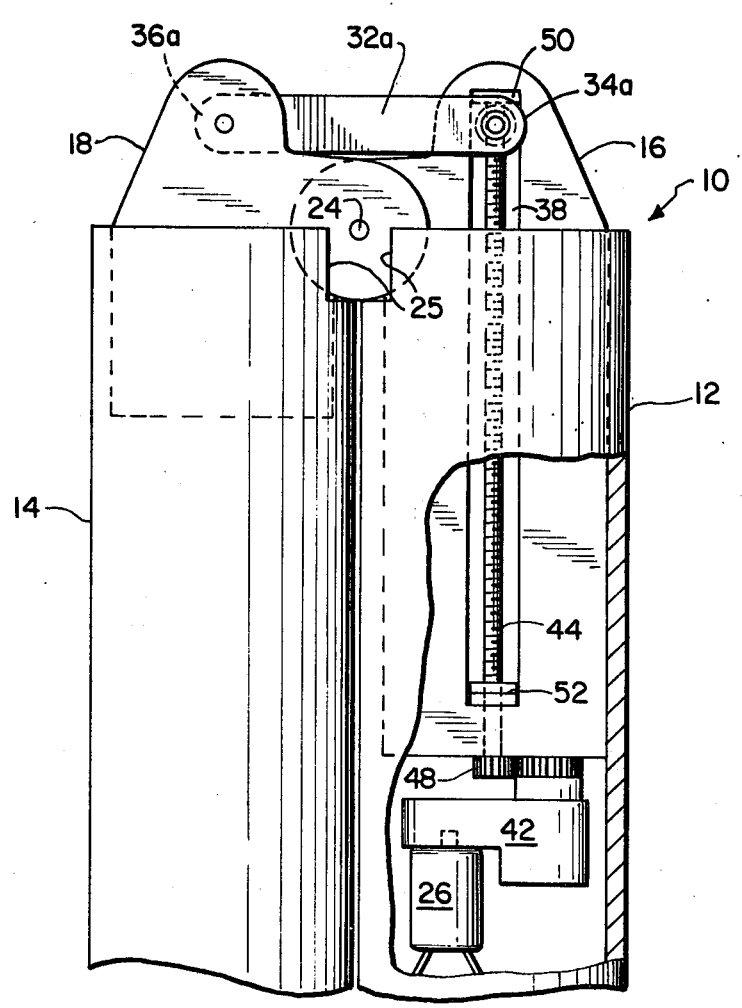
FIG. 1 is a side view, partially broken, of the motor driven hinge assembly of the present invention in its folded position.

Turning now to a consideration of the drawing, and in particular to FIG. 1, there is shown the motor driven hinge assembly 10 of the present invention. The assembly 10 is employed for folding and unfolding hinged members.

The assembly 10 comprises a first member, such as the first tube 12, and a second member, such as the second tube 14, which are hingedly connected in a manner to be described hereinafter. It is to be understood, however, that the first and second members could have any other desired shape, such as, for example, a generally flat shape, without reducing the effectiveness of the present invention. The first and second tubes 12 and 14 preferably include recesses near the ends thereof, or they can be hollow. The first tube 12 includes a first bracket 16 and the second tube 14 includes a second bracket 18 near the hinged ends of the tubes. The first and second brackets 16 and 18 can be integral with their respective tubes or can be attached to them in any appropriate manner, such as by welding. A portion of each of the first and second brackets 16 and 18 is within the interior of the first and second tubes 12 and 14, respectively, as can be seen by the dashed lines in FIG. 1, while the remaining portion of each of the brackets extends beyond the ends of the tubes.

Figure 2:
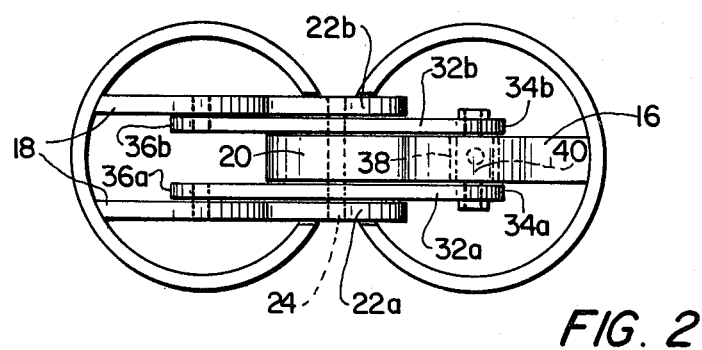
FIG. 2 is a top view of the motor driven hinge assembly.
Figure 7:
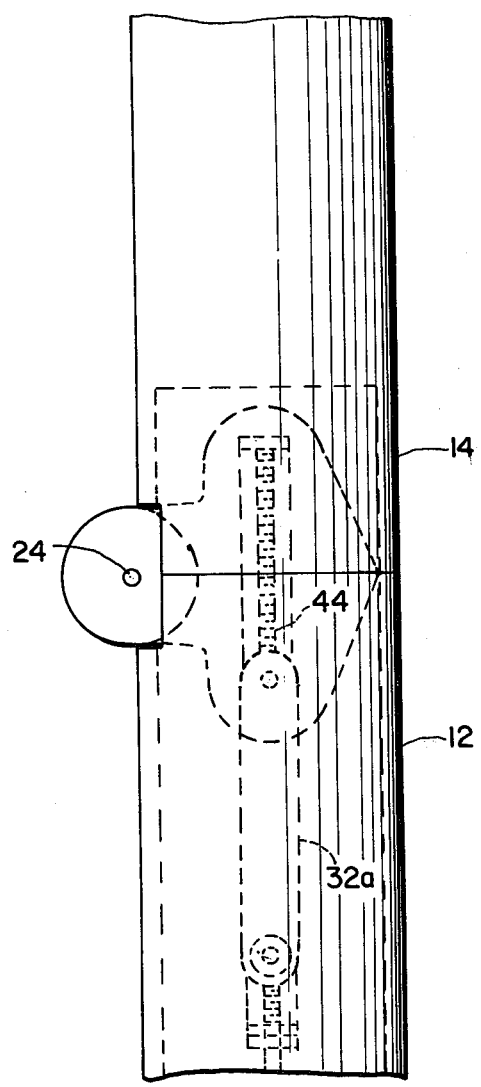
FIG. 7 is a side view of the motor driven hinge assembly in its unfolded position.

The first and second brackets 16 and 18 are configured such that they not only can be hingedly connected but also do not interfere with each other when the first and second tubes are unfolded to abut end-to-end, in the position shown in FIG. 7. Preferably, and as is seen in FIG. 2, the first bracket 16 comprises a single elongated bracket which includes a single flange 20. The second bracket 18 comprises a double bracket which includes a double flange 22a and 22b. The single flange 20 of the first bracket extends between the double flange 22a and 22b of the second bracket and a hinge pin 24 extends through the single and double flanges 20 and 22a and b to thereby hingedly connect the brackets and therefore the first and second tubes 12 and 14. This configuration provides sufficient clearance adjacent the first and second brackets 16 and 18 such that the first and second tubes can be unfolded to abut end-to-end without interference between the brackets.

Returning to FIG. 1, the hinge pin 24 is preferably positioned such that when the tubes 12 and 14 are folded with their sides closely adjacent, as is shown in FIG. 1, the hinge pin 24 is aligned with the sides. In addition, the hinge pin 24 is preferably aligned with the ends of the first and second tubes 12 and 14 such that the tubes will abut end-to-end when in the unfolded position of FIG. 7. In order to accommodate such hinge pin positioning, portions of the sides of the first and second tubes 12 and 14 include cutouts 25 adjacent the hinge pin 24, thus allowing the single and double flanges 20 and 22a and b to extend through the cutouts 25 and surround the hinge pin 24 sufficiently to provide adequate support.

Figure 3:
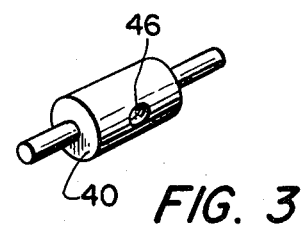
FIG. 3 is a perspective view of a rod which extends between drive links in the motor driven hinge assembly.

As is shown in FIG. 1, the assembly 10 includes motorized pivoting means for effecting pivotal motion of the second tube 14 relative to the first tube 12. The motorized pivoting means comprises a motor 26 disposed within the first tube 12, linking means, such as at least one and preferably a pair of drive links 32a and 32b, connecting the first and second tubes 12 and 14, and coupling means between the motor 26 and the linking means for transmitting the work output of the motor 26 to the linking means. The drive links 32a and b, shown in FIG. 2, have first ends 34a and b, respectively slidingly connected with the first bracket 16 of the first tube 12 and have second ends 36a and b, respectively, pivotally connected with the second bracket 18 of the second tube 14. The first bracket 16 includes an elongated slot 38, best seen in FIG. 1, which extends from near the outer end to near the inner end of the bracket. The pair of drive links 32a and b includes a rod 40, shown in FIGS. 2 and 3, or a similar device, which extends between the first ends 34a and b of the drive links. The rod 40 is sized for being engaged in the slot 38 of the first bracket 16, thereby slidingly connecting the drive links to the first bracket.

Returning to FIG. 1, the coupling means, which extends between the motor 26 and the drive links 32a and b, is arranged to impart motion to the rod 40 to thereby slide the first ends 34a and b of the drive links 32a and b along the slot 38 and into or out of the interior of the first tube 12. As will be explained shortly, such motion of the drive links imparts pivotal motion to the second tube 14 relative to the first tube 12. One example of suitable coupling means comprises a gear train 42 and a threaded lead screw 44. When employing the threaded lead screw 44, the rod 40 includes a threaded opening 46 therein sized for receiving the lead screw. The motor 26, which can be electric or other type of motor, imparts rotational motion to gears within the gear train 42 which are arranged to provide a rotational output of reduced rotational speed. The combination of the gear train 42 and the lead screw 44 provides a high mechanical advantage. Thus, even a small, relatively low powered motor 26 provides sufficient force through the gear train and lead screw to pivot even relatively large second tubes 14.

A gear 48, attached to the inner end of the lead screw 44, is rotated by the gear train 42. The lead screw 44 rotates with the gear 48 causing the rod 40, and thus the drive links 32a and b, to move along the lead screw. By reversing the direction of rotation of the lead screw, the rod 40 and the drive links 32a and b will move along the lead screw in the opposite direction. Thus, the assembly 10 can be employed to both fold and unfold the first and second tubes 12 and 14. Additionally, the motor 26 can be stopped when the first and second tubes 12 and 14 are at intermediate pivotal positions between the folded and unfolded positions. Thus, numerous relative pivotal positions between the first and second tubes can be obtained with the present assembly 10. The lead screw 44 preferably also includes thrust bearings 50 and 52 at the outer and inner ends, respectively thereof, for supporting the lead screw against tension and compression loads.

The motor driven hinge assembly 10 effects relative pivotal motion of the first and second tubes 12 and 14 between a folded position and an unfolded position as follows:

FIG. 1 shows the assembly 10 in a folded position with the sides of the first and second tubes 12 and 14 adjacent each other.

Figure 4:
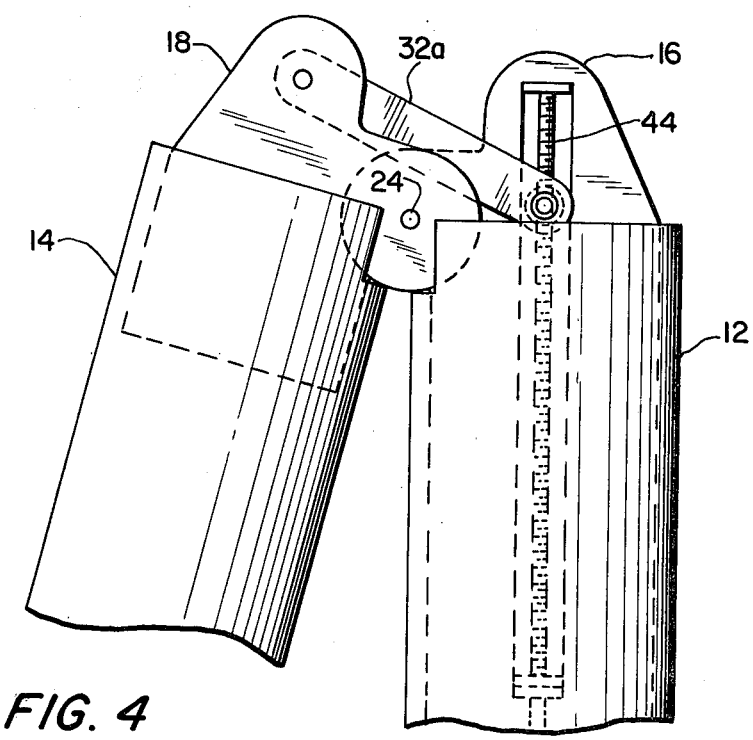
FIGS. 4 through 6 are side views of the motor driven hinge assembly in various intermediate pivotal positions.

Turning to FIG. 4, as the lead screw 44 is rotated by the motor 26 and the gear train 42, it causes the rod 42, along with the first ends 34a and b of the drive links 32a and b to be moved toward the interior of the first tube 12 along the lead screw. The drive links 32a and b pull the second bracket 18 toward the first bracket 16 causing the second tube 14 to pivot about the hinge pin 24.

Figure 5:
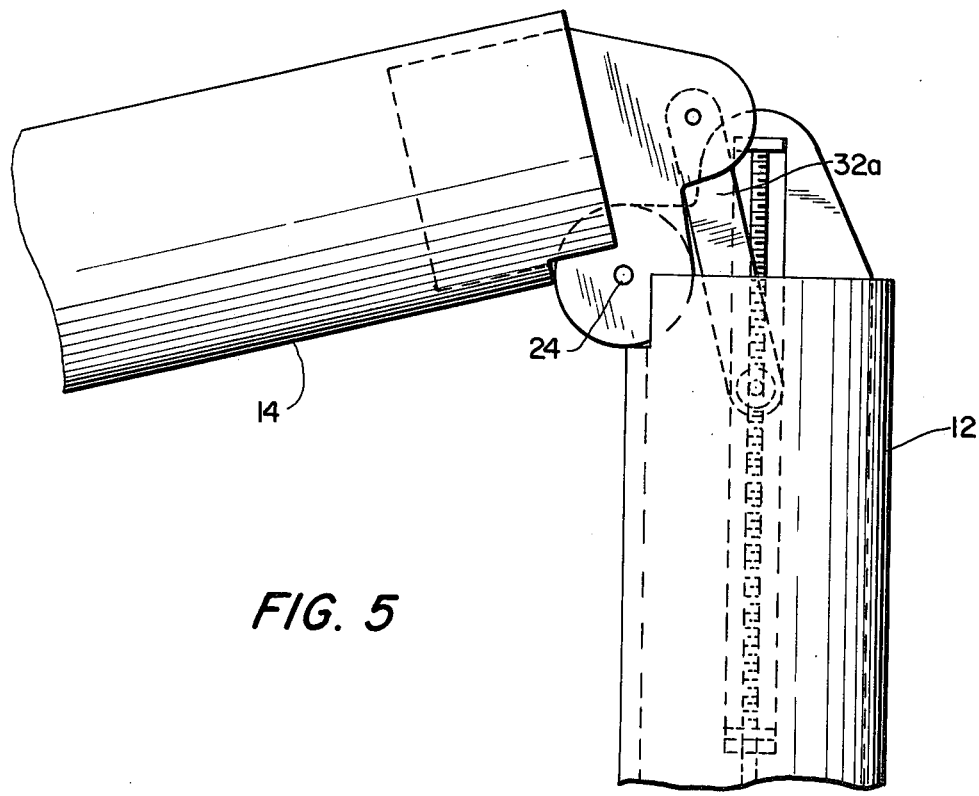

Turning to FIG. 5, the drive links 32a and b are moved further into the interior of the first tube 12 while the second tube 14 continues to pivot about the hinge pin 24.

Figure 6:
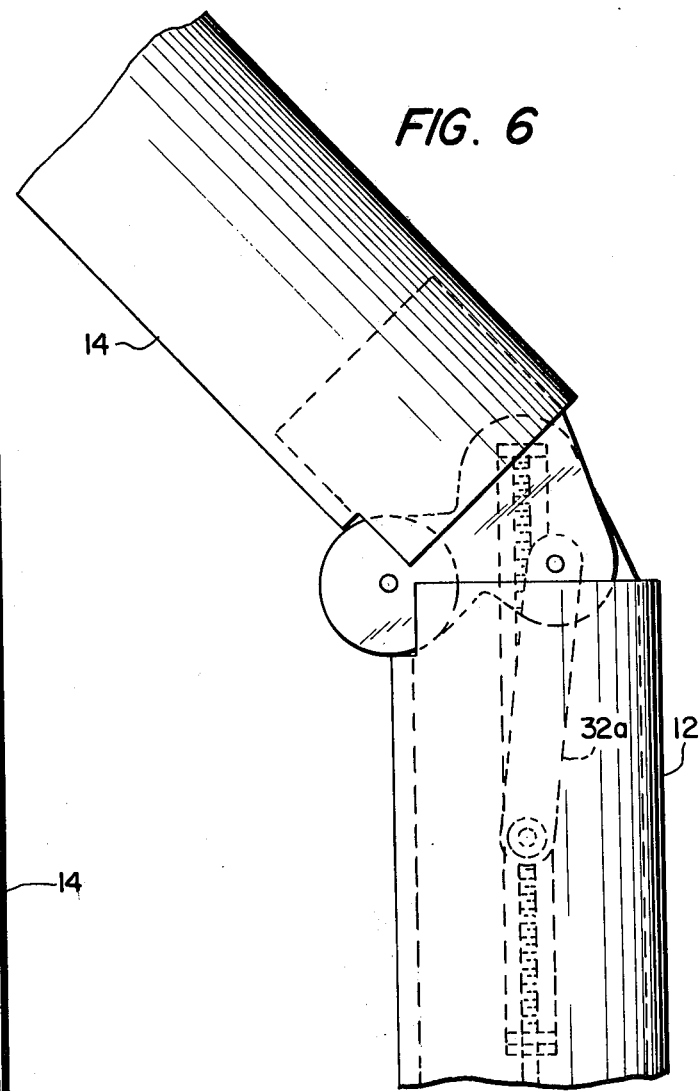

FIG. 6 shows the drive links 32a and b moved almost completely into the interior of the first tube 12 while the second tube 14 is pivoted such that it approaches the unfolded position.

FIG. 7 shows the assembly in the unfolded position with the first and second tubes 12 and 14 abutting end to end. The drive links 32a and b have been moved to a position such that the first ends 34a and b thereof are near the inner end of the lead screw 44.

As can be seen when the first and second tubes 12 and 14 are in the unfolded position of FIG. 7, the elements which pivot the tubes, specifically, the motor 26, and gear train 42, the lead screw 44 and the drive links 32a and b, as well as the first and second brackets 16 and 18 except for the portions thereof adjacent the hinge pin 24, are all contained entirely within the interior of the tubes. Even when in the folded position of FIG. 1, only the drive links 32a and b and portions of the lead screw 44 and of the first and second brackets 16 and 18 are exterior to the tubes. The assembly 10 is thus a compact assembly, its compactness being an attribute particularly when storage space for the folded assembly is limited, such as in a space launch vehicle.

To reposition the first and second tubes 12 and 14 from the unfolded position of FIG. 7 to the folded position of FIG. 1, the direction of rotation of the lead screw 44 is reversed. The second tube 14 will the pivot about the hinge pin 24 in the opposite sequence as that described above.

It is to be understood that this invention is not limited to the particular embodiment disclosed and it is intended to cover all modifications coming within the true spirit and scope of this invention as claimed. For example, the cross-sectional shapes of the tubes 12 and 14 do not necessarily have to be round but can have any other desired shape.

What is claimed is:

1. A motor driven hinge assembly for effecting pivotal motion of a second hollow tubular member relative to a first hollow tubular member comprising:
   (a) said first member having an interior and said second member having an interior, said first and second members having first and second brackets, respectively, connected thereto near the top ends of said first and second members and said first and second members being hingedly connected with a hinge pin extending through said first and said second brackets, said hinge pin being positioned whereby when said first and said second members are in a folded position, sides of said first and second members being disposed closely adjacent each other with said first and second members being disposed in parallel relationship, and when in an unfolded position said ends thereof abut end-to-end, said first and said second members including recesses near said ends thereof below the hinge pin to accommodate portions of the first and second brackets;
   (b) linking means always extending above the hinge pin and having a first end slidingly connected with said first bracket and a second end pivotally connected with said second bracket;
   (c) a motor disposed within said interior of said first member; and
   (d) coupling means between said motor and said first end of said linking means for effecting motion of said linking means into or out of said interior of said first member through the top end of the first member through the top end of the first member thereby effecting pivotal motion of said second member relative to said first member between said folded and said unfolded positions, said linking means, said coupling means and said first and said second brackets except for the portions thereof adjacent said hinge pin being configured and positioned for being contained entirely within said interior of said first and of said second members when in an unfolded position.

2. The assembly of claim 1 wherein said first bracket includes a slot therein and wherein said linking means comprises a pair of drive links including a rod disposed between the first ends thereof, said rod being sized for being slidingly engaged by said slot.

3. The assembly of claim 2 wherein said coupling means comprises a gear train and a threaded lead screw arranged for being rotated by said motor and wherein said rod on said drive links includes a threaded opening therein sized for receiving said lead screw whereby rotation of said lead screw imparts motion to said rod and to said drive links along said lead screw.

4. The assembly of claim 3 wherein said threaded lead screw includes thrust bearings at both ends thereof for supporting said threaded lead screw against tension and compression loads.

5. The assembly of claim 3 wherein the direction of rotation of said lead screw is reversible for thereby selecting the direction of pivotal motion of said second tube relative to said first tube.

6. The assembly of claim 1 wherein said first bracket includes a single flange and said second bracket includes a double flange between which said single flange extends, said hinge pin extending through said single and said double flanges for hingedly connecting said first and said second members.

* * * * *